US012669742B2

(12) United States Patent
Swaney et al.

(10) Patent No.: US 12,669,742 B2
(45) Date of Patent: Jun. 30, 2026

(54) MARINE CAMERA MOUNTING SYSTEM

(71) Applicant: Garmin International, Inc., Olathe, KS (US)

(72) Inventors: Raymond D. Swaney, Prairie Village, KS (US); Samuel T. Pirtle, Shawnee, KS (US); William M. Jones, Olathe, KS (US); Michael T. Fickenscher, Overland Park, KS (US)

(73) Assignee: Garmin International, Inc., Olathe, KS (US)

( * ) Notice: Subject to any disclaimer, the term of this patent is extended or adjusted under 35 U.S.C. 154(b) by 483 days.

(21) Appl. No.: 18/059,131

(22) Filed: Nov. 28, 2022

(65) Prior Publication Data

US 2023/0174197 A1 Jun. 8, 2023

Related U.S. Application Data

(60) Provisional application No. 63/285,658, filed on Dec. 3, 2021.

(51) Int. Cl.
*G03B 17/56* (2021.01)

(52) U.S. Cl.
CPC ................................. *G03B 17/561* (2013.01)

(58) Field of Classification Search
CPC .... G03B 15/006; G03B 15/0431; G03B 5/06; G03B 17/56; G03B 17/561; G03B 17/566; G03B 15/02; G03B 15/03
See application file for complete search history.

(56) References Cited

U.S. PATENT DOCUMENTS

| | | | |
|---|---|---|---|
| 2017/0195568 A1* | 7/2017 | Leizerovich, Jr. ..... | G03B 37/04 |
| 2019/0011811 A1* | 1/2019 | Tiefenbrunn ........... | G08B 5/36 |
| 2020/0369351 A1 | 11/2020 | Behrendt et al. | |

FOREIGN PATENT DOCUMENTS

| | | | |
|---|---|---|---|
| CN | 209467339 U | * 10/2019 | |
| CN | 214228318 U | * 9/2021 | |
| WO | WO-2020107339 A1 * | 6/2020 | ............. G03B 17/02 |

OTHER PUBLICATIONS

Translation of CN209467339; Title: Unmanned Aerial Vehicle Aerial Photography Device with Rainproof Structure; Inventor: Gao et al. Publication Date: Oct. 8, 2019. (Year: 2019).*

(Continued)

*Primary Examiner* — Stephanie E Bloss
*Assistant Examiner* — Fang-Chi Chang
(74) *Attorney, Agent, or Firm* — Samuel M. Korte; Max M. Ali; Kathleen D. Fitterling

(57) ABSTRACT

A camera mounting system for a vehicle. The camera mounting system comprises a base mount configured to be coupled with an exterior surface of the vehicle. The base mount includes an interior space. The camera mounting system additionally comprises a sub-housing received within the interior space of the base mount. The sub-housing is configured to rotate within the base mount. The camera mounting system additionally comprises a camera configured to be removably mounted to the sub-housing. As such, when the camera is mounted to the sub-housing, the camera is configured to rotate in conjunction with the sub-housing. The camera mounting system additionally comprises at least one damper configured to permit a position of the camera to translate toward the sub-housing in response to an external object impacting the camera. The camera mounting system further comprises at least one attitude sensor configured to sense an orientation of the camera.

20 Claims, 10 Drawing Sheets

(56)  References Cited

OTHER PUBLICATIONS

Translation of WO2020107339; Title: Camera Module and Method for Assembling Same, Image Transmission Device, and Movable Platform; Inventor: Li; Publication Date: Jun. 4, 2020. (Year: 2020).*

IRIS Product Brochure 23, dated Dec. 10, 2022.

* cited by examiner

MARINE CAMERA MOUNTING SYSTEM

CROSS-REFERENCE TO RELATED APPLICATION

The present non-provisional patent application claims the priority benefit of U.S. Provisional Patent Application Ser. No. 63/285,658, filed Dec. 3, 2021, entitled MARINE CAMERA MOUNTING SYSTEM. The entirety of the above-identified provisional patent application is incorporated herein by reference.

FIELD

Embodiments of the present invention are directed to a camera mounting system for a vehicle. More particularly, embodiments of the present invention are directed to a camera mounting system for replaceably mounting a camera to a marine vessel.

DESCRIPTION OF RELATED ART

The use of cameras on marine vessels has become prevalent over recent years. Cameras can assist marine vessel operators with maneuvering vessels in marine environments. For example, cameras on marine vessels can be used to obtain digital images and/or videos of the external environment around the vessels. Such images and/or videos can be presented on electronic displays, so as to facilitate manually docking and other maneuvering of the vessels, especially close-quarter maneuvering. Such cameras advantageously facilitate vessel operators, especially inexperienced operators, with maneuvering vessels under adverse and otherwise challenging conditions, such as during strong winds or currents, poor lighting, the presence of other boats, ships, or objects, poor fields of vision (especially for larger boats and ships), or poor maneuverability (especially for vessels without thrusters or forward motors).

Unfortunately, cameras previously-used on marine vessels were difficult and time-consuming to install and to properly position and/or calibrate. For example, certain marine vessels required use of surround view systems, comprising multiple cameras positioned around the vessels to obtain multiple camera angles and overlapping fields of view. Such a configuration of cameras often necessitated complex or delicate installation of the cameras. In addition, when such previously-used cameras were damaged, or otherwise required replacement, the physical replacement of such cameras was generally difficult, time-consuming, and expensive. As such, there is a need for a marine camera mounting system, which permits cameras to be quickly and efficiently installed, positioned, repaired, and/or replaced on marine vessels.

Summary

Embodiments of the present invention comprise a camera mounting system for a vehicle. The camera mounting system comprises a base mount configured to be coupled with an exterior surface of the vehicle. The base mount includes an interior space. The camera mounting system additionally comprises a sub-housing received within the interior space of the base mount. The sub-housing is configured to rotate within the base mount. The camera mounting system additionally comprises a camera configured to be removably mounted to the sub-housing. As such, when the camera is mounted to the sub-housing, the camera is configured to rotate in conjunction with the sub-housing. The camera mounting system additionally comprises at least one damper configured to permit a position of the camera to translate toward the sub-housing in response to an external object impacting the camera. The camera mounting system further comprises at least one attitude sensor configured to sense an orientation of the camera.

Embodiments of the present invention additionally include a method of mounting a camera to a vehicle. The method comprises a step of providing a base mount engaged with an exterior surface of the vehicle. The base mount includes an interior space. An additional step includes providing a sub-housing received within the interior space of the base mount. The sub-housing is configured to rotate within the base mount. An additional step includes mounting a camera to the sub-housing. Upon such mounting, the camera is configured to rotate in conjunction with the sub-housing. An additional step includes sensing, from an attitude sensor, an orientation of the camera. A further step includes providing a damper between the camera and the sub-housing. The damper is configured to permit a position of the camera to translate toward the sub-housing in response to an external object impacting the camera.

This summary is not intended to identify essential features of the present invention, and is not intended to be used to limit the scope of the claims. These and other aspects of the present invention are described below in greater detail.

BRIEF DESCRIPTION OF THE DRAWINGS

Embodiments of the present invention are described in detail below with reference to the attached drawing figures, wherein.

Figure 1:
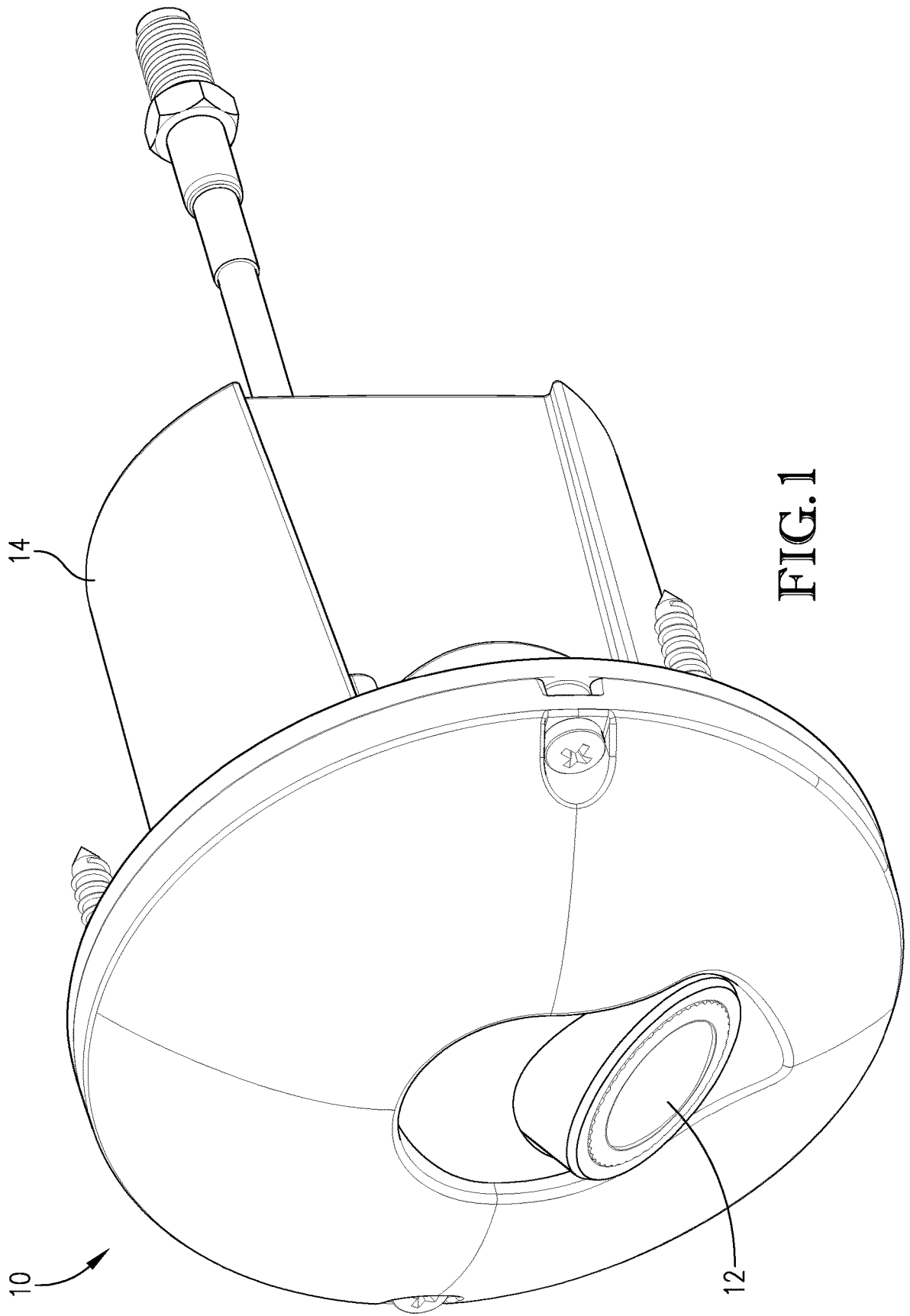
FIG. 1 is a perspective view of a mounting assembly and a camera, each part of a camera mounting system according to embodiments of the present invention.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Embodiments of the present invention are directed to a camera mounting system for a vehicle. In certain embodiments, the camera mounting system may permit one or more cameras to be removably and/or replaceably mounted to interior and/or exterior walls, panels, and/or surfaces of a vehicle, such that a user of the vehicle can observe the real-time environment around and/or within the vehicle. In some configurations, the cameras may capture the external environment around the vehicle, the internal environment within the vehicle such as motor rooms, bilges, etc., combinations thereof, and the like. The vehicle to which the cameras can be mounted may include various types of vehicles, such as automobiles (e.g., cars, trucks, motorcycles, etc.), aircraft, trains, cargo-haulers, trailers, etc. However, in certain specific embodiments, the vehicle may comprise a marine vessel, such as a boat, ship, tanker, freighter, barge, or other watercraft. As used herein, "marine" refers to generally any aquatic environment, including so-called "brown" or "blue" water environments, such as rivers, lakes, coastal areas, seas, and oceans.

Figure 2:
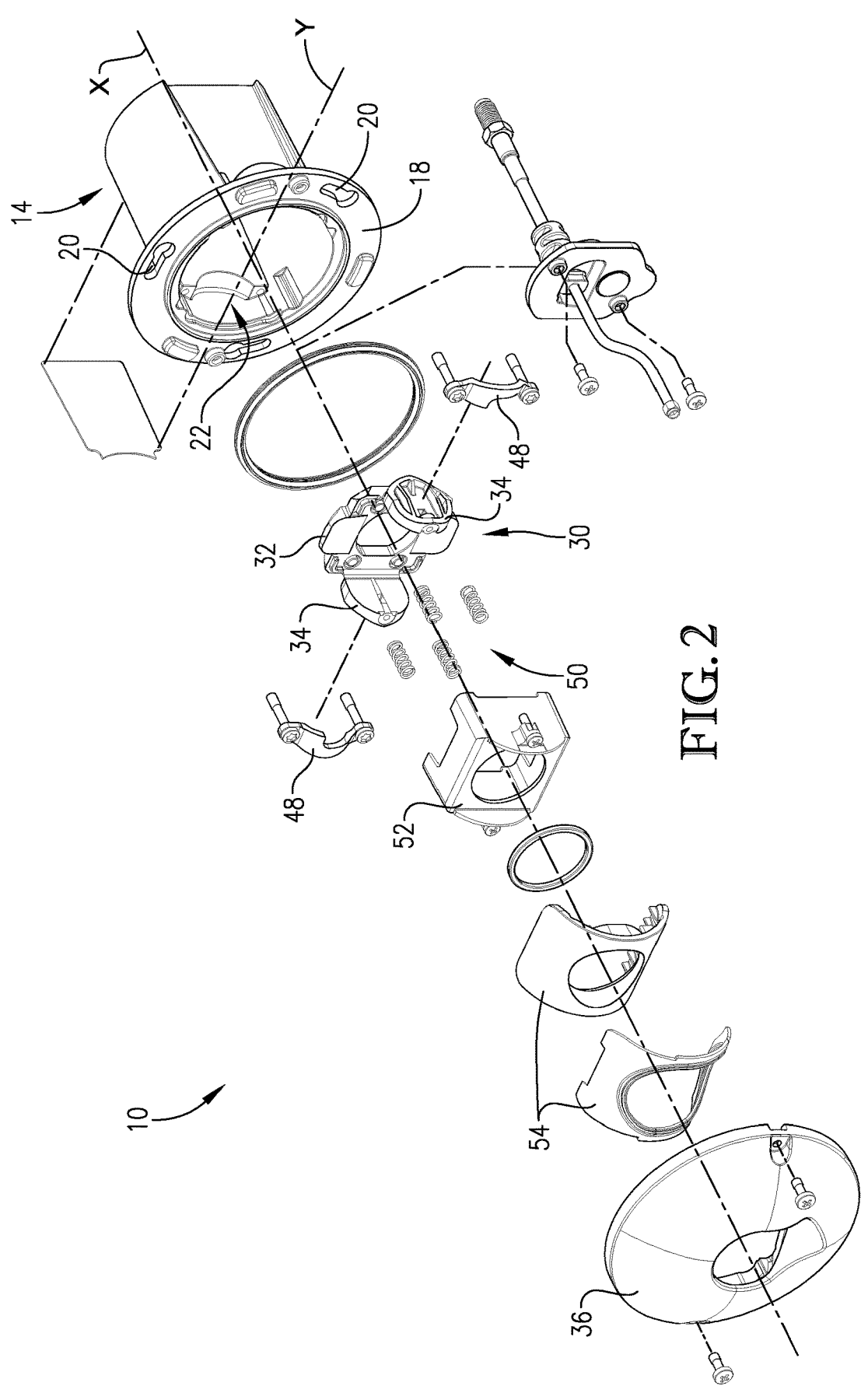
FIG. 2 is a first side exploded view of the mounting assembly from FIG. 1.
Figure 3:
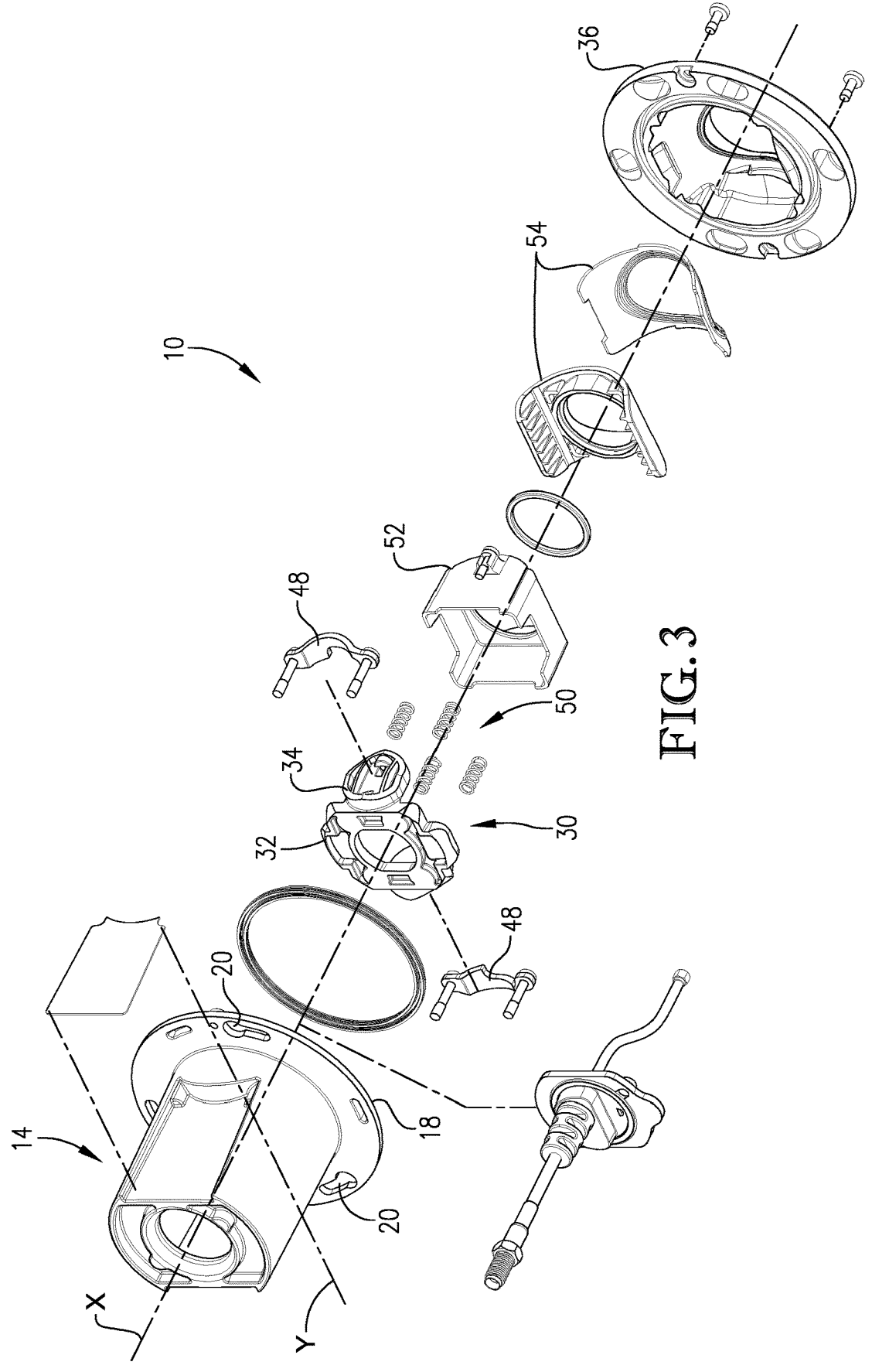
FIG. 3 is a second side exploded view of the mounting assembly from FIGS. 1 and 2.
Figure 4:
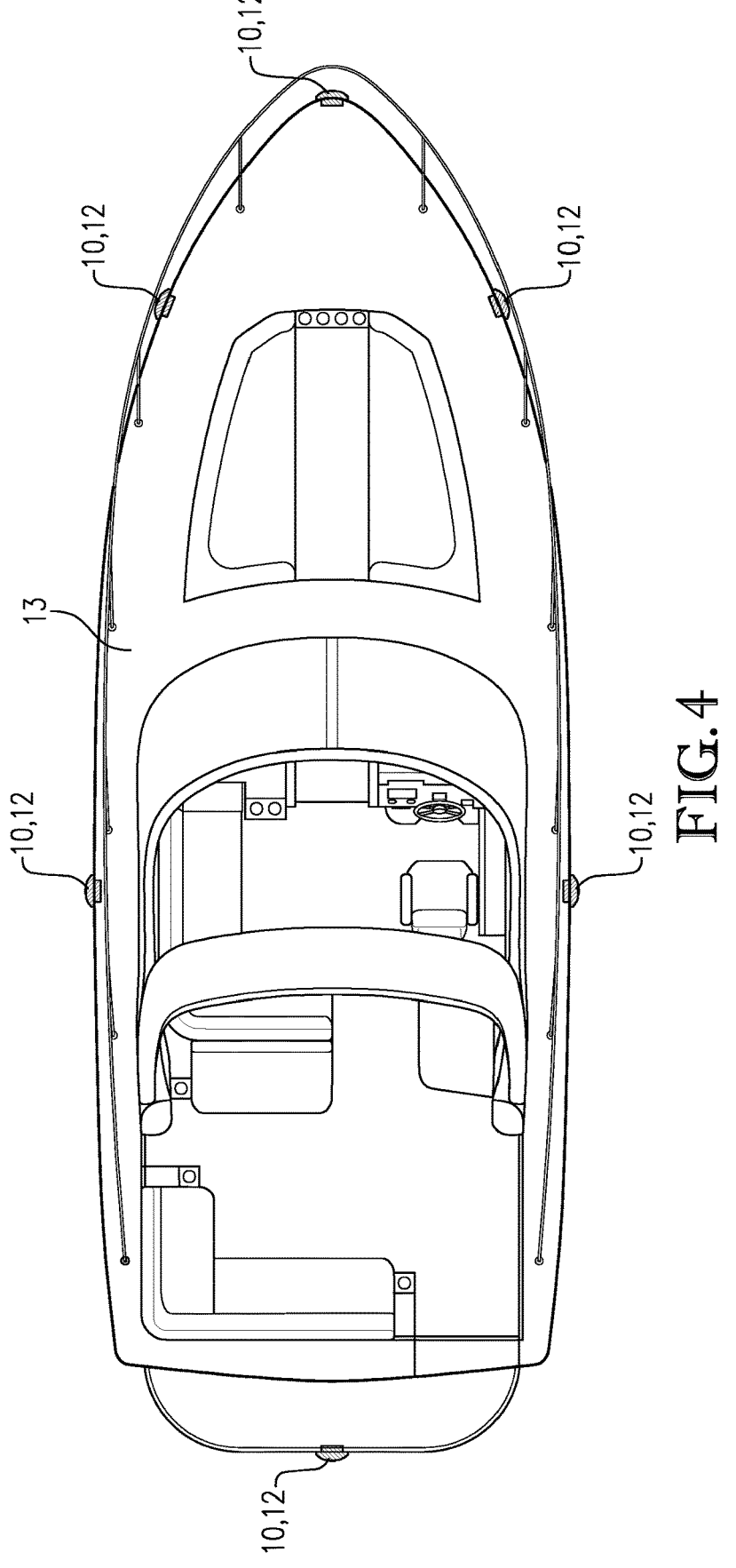
FIG. 4 is a top plan schematic of a marine vessel with a plurality of mounting assemblies and cameras positioned around a hull of the marine vessel.

In more detail, the camera mounting system may comprise one or more mounting assemblies 10, as illustrated in FIGS. 1-3, with each mounting assembly 10 being associated with a camera 12 that can be replaceably mounted to the mounting assembly 10 and, thus, to a vehicle. As will be described in more detail below, each of the mounting assemblies 10 may be configured to releasably mount a camera 12 (See, e.g., FIG. 1) to an exterior surface of a vehicle, such as the marine vessel 13 illustrated in FIG. 4. As such, the camera mounting system may include a plurality of mounting assemblies 10 positioned around the exterior of the marine vessel 13. Each of such plurality of mounting assemblies 10 may be used to mount a camera 12 to the marine vessel 13, such that the cameras 12 can obtain multiple views around the marine vessel 13. In some embodiments, as illustrated in FIG. 4, the mounting assemblies 10, and associated cameras 12, may be positioned around the hull of the marine vessel 13 such that the cameras 12 are configured to obtain overlapping, "360°" surround views of the external environment around the marine vessel 13. Beneficially, embodiments of the present invention provide a camera mounting system that may be used to mount multiple cameras 12 on the marine vessel's 13 hull in a manner that enables easy installation, replaceability, and positional adjustment of the cameras 12. Although shown in FIG. 4 as a medium-sized boat, the marine vessel 13 may be substantially any boat, ship, or other vehicle configured to travel in, on, or over water, including substantially any suitable size, type, and overall design, and which would benefit from the camera mounting system.

Returning to FIGS. 1-3, each mounting assembly 10 may comprise a base mount 14, which as described in more detail below, is configured to be coupled with an exterior of a vehicle. In some embodiments, as perhaps best illustrated in FIGS. 2 and 3, the base mount 14 may comprise an elongated housing with a primary opening at one end, such that the primary opening provides access to an interior space presented by the housing. Generally, due to the base mount 14 being elongated, the base mount 14 (and remainder of the mounting assembly 10) will include a longitudinal axis "X" extending through the center of the base mount 14 along the length of the base mount 14. In certain embodiments, the base mount 14 may have a generally cylindrical shape; although the base mount 14 may have other shapes as required for integration with specific vehicles or for specific functionalities.

Figure 5:
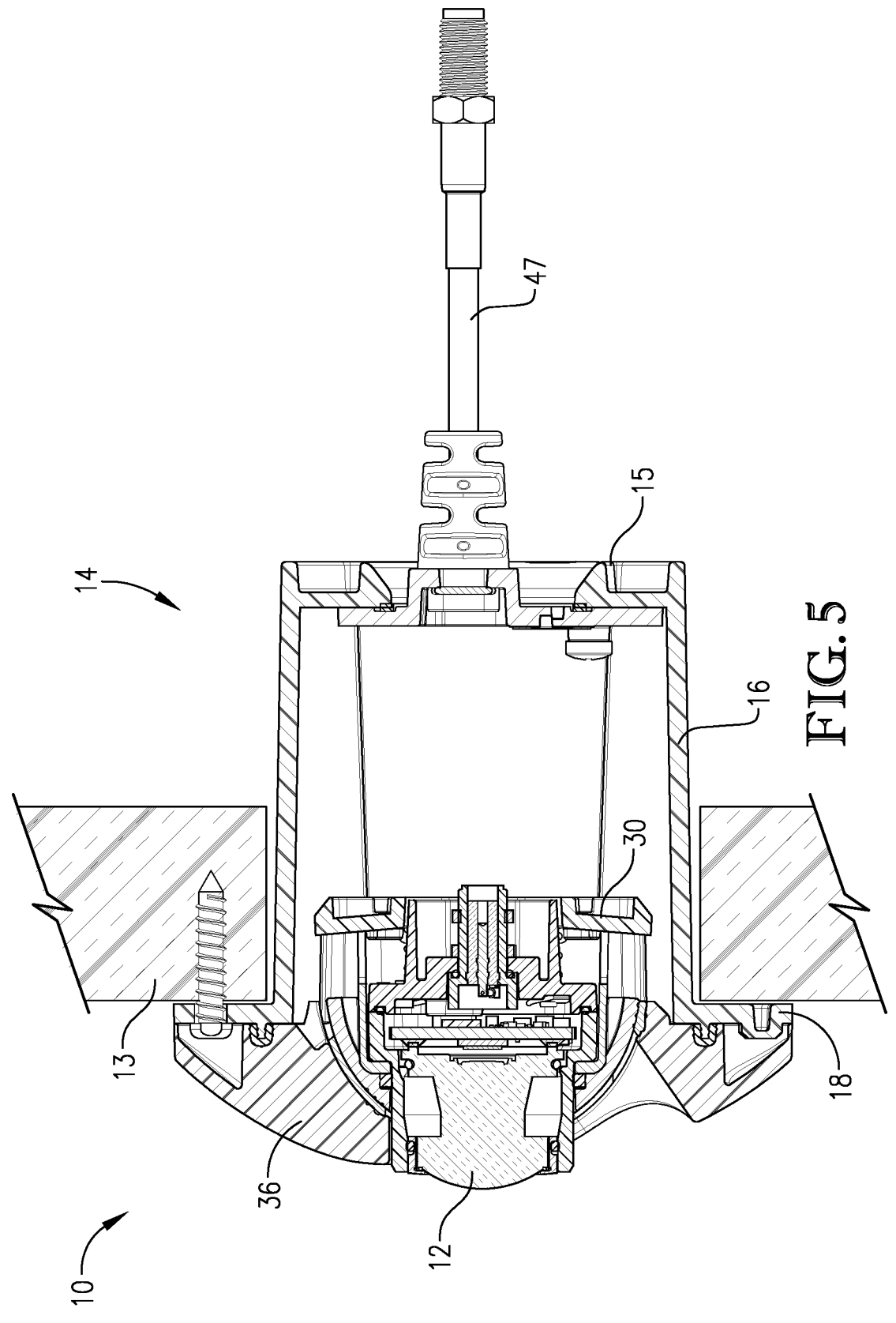
FIG. 5 is a cross section of the mounting assembly and the camera from FIG. 1 mounted to an exterior of a vehicle.

In more detail, as illustrated by FIG. 5, the base mount 14 may include a bottom panel 15 located at a proximal end of the base mount 14. The bottom panel 15 may include a central aperture extending therethrough. The base mount 14 may additionally include a cylindrical side panel 16 extending from the bottom panel 15 to the primary opening located at the distal end of the base mount. The distal end may include an annular flange 18 that extends outward, perpendicularly from the side panel 16 and that surrounds the primary opening of the base mount 14. The annular flange 18 may include a plurality of receiving apertures 20 (as best shown in FIGS. 2 and 3) for receiving fasteners used to affix the base mount 14 to the marine vessel 13, as shown in FIG. 5. The interior of the base mount 14 may, as shown in FIGS. 2 and 3, comprise a pair of shelf surfaces 22 extending from opposite sides of the interior surface of the side panel 16. Such shelf surfaces 22 may have an arcuate shape, such as a semi-circle.

Each mounting assembly 10 may further comprise a sub-housing 30 that is configured to be removably received within the interior space of the base mount 14 and is further configured to rotate with respect to the base mount 14. In more detail, as perhaps best illustrated by FIGS. 2 and 3, the sub-housing 30 may include a bottom panel 32 at a proximal end of the sub-housing 30. The bottom panel 32 may include a central aperture extending therethrough. The sub-housing 30 may additionally include a pair of side supports 34 that extend distally from opposite sides of the bottom panel 32. The side supports 34 may each have generally circular shapes that are configured to movably/rotatably engage with the shelf surfaces 22 of the base mount 14.

The mounting assembly 10 may additionally comprise a cover 36 configured to fit onto the distal end of the base mount 14. For example, the cover 36 may have a generally circular shape with a central aperture. As such, the cover 36 is configured to engage with the annular flange 18 of the base mount 14 via fasteners, so as to at least partially cover the primary opening presented at the distal end of the base mount 14.

Figure 6:
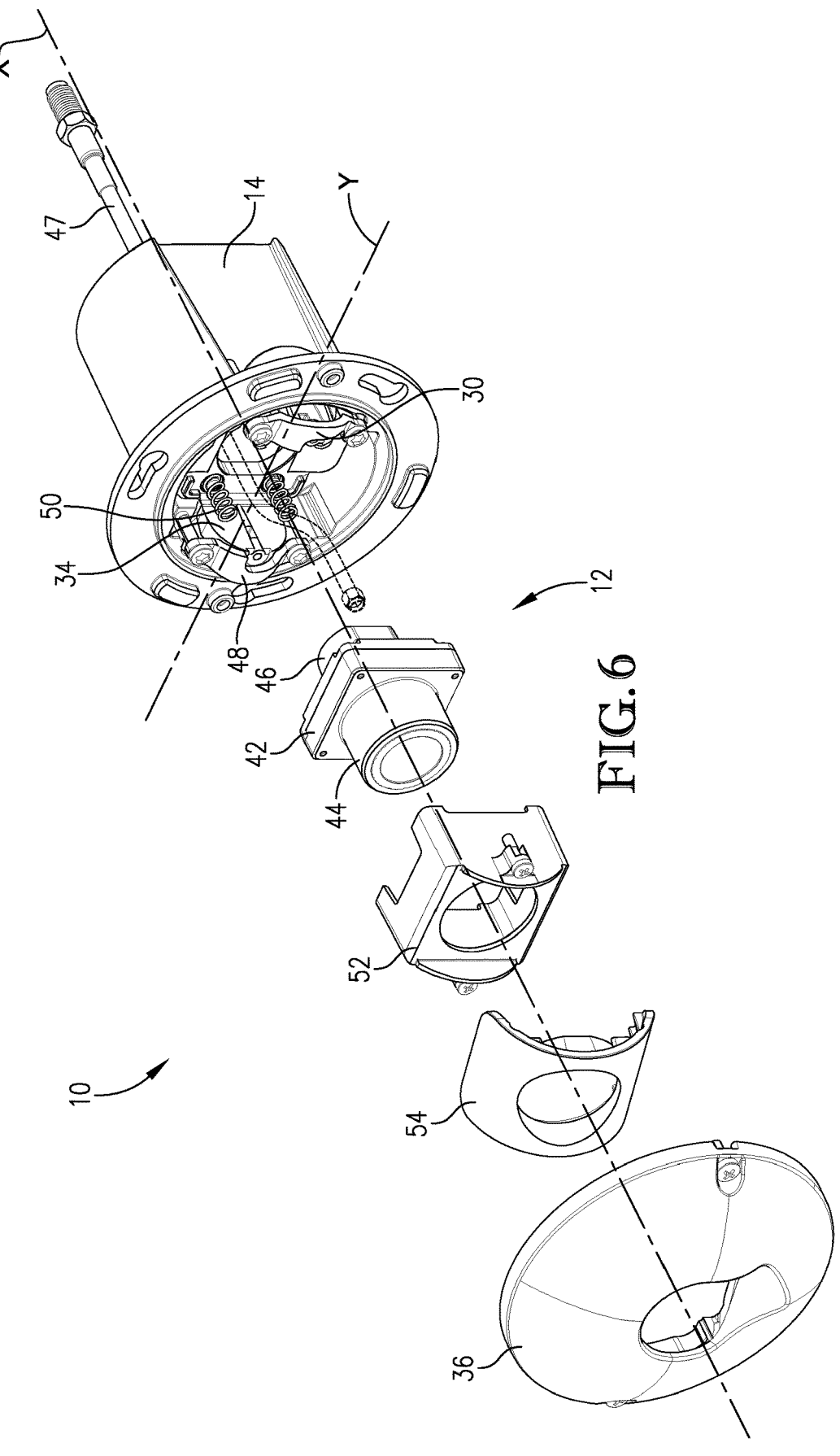
FIG. 6 is front exploded view of the mounting assembly and the camera from FIG. 1.
Figure 7:
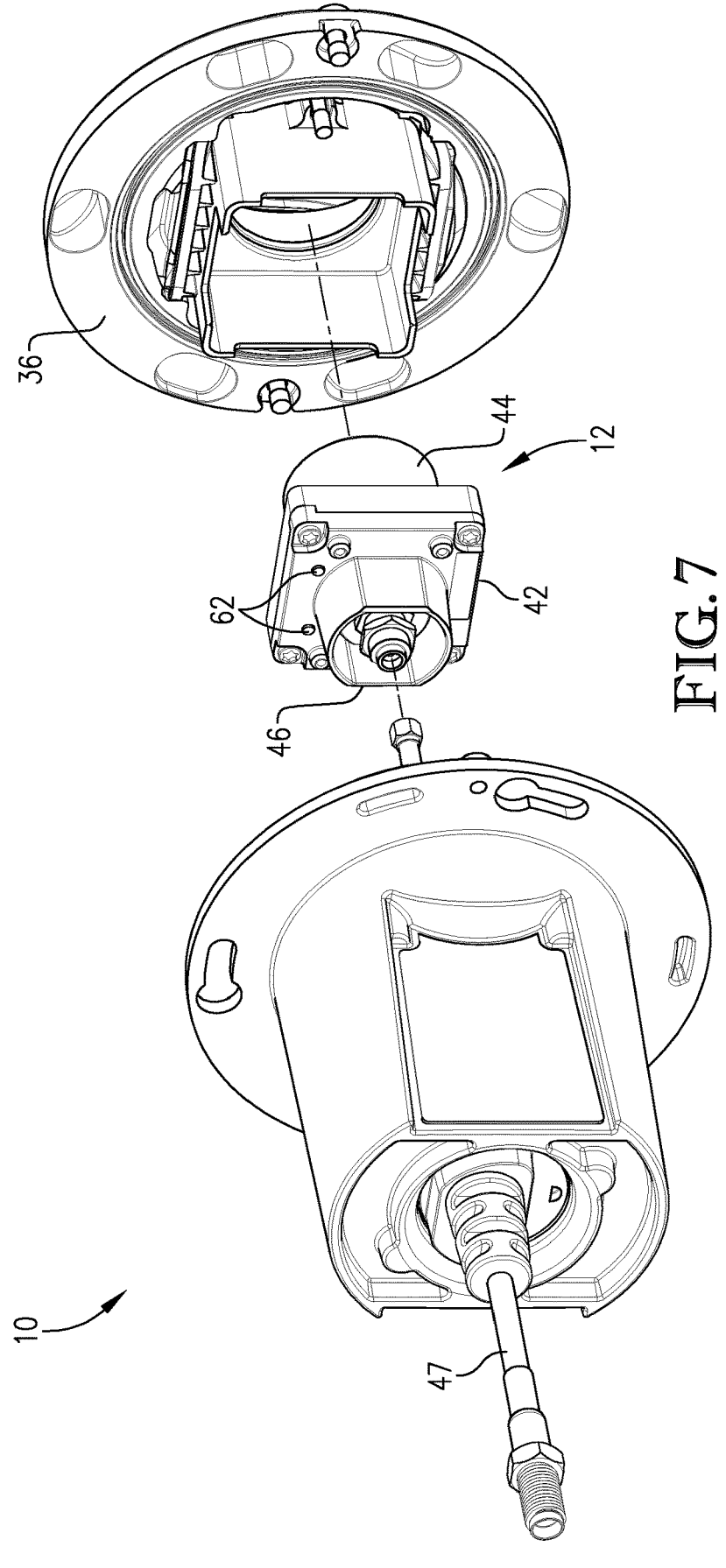
FIG. 7 is a rear exploded view of the mounting assembly and the camera from FIG. 1.

Each mounting assembly 10 of the camera mounting system may be associated with a camera 12, as shown in FIGS. 5-7. The cameras 12 described herein may employ substantially any suitable technology to generate digital images and/or video of substantially any suitable nature, such as optical, radar, lidar, and/or infrared. In some embodiments, each camera 12 may be sized so as to be engaged with and/or received within the sub-housing 30. For instance, the camera 12 may have a generally rectangular or cuboid shape. As such, the camera 12 may be attached to the bottom panel 32 of the sub-housing 30 between the side supports 34. In more detail, as perhaps best shown in FIGS. 6 and 7, the camera 12 may comprise a central, main section 42 that is generally rectangular or cuboid in shape. The camera 12 may additionally include a lens section 44 that extends distally from the main section 42, and an electrical port 46 that extends proximally from the main section 42.

Other components of the camera mounting system, including of the mounting assemblies 10 and/or the cameras 12, will be discussed in more detail below with respect to installation and operation of the camera mounting system.

To install a mounting assembly 10 within a vehicle, such as the marine vessel 13, the base mount 14 may be inserted within an opening formed through an exterior of the vehicle. For instance, as illustrated in FIG. 5, the base mount 14 may be inserted within an opening formed in the hull of the marine vessel 13. Although the following description provides an exemplary process for installing the camera mount system within a marine vessel, it should be understood that the process may similarly apply to other types of vehicles. Continuing on, the proximal end of the base mount 14 may be inserted within an opening formed in the hull of the marine vessel 13 until the annular flange 18 contacts the exterior surface of the hull. As such, fasteners may be inserted through the receiving apertures 20 of the annular flange 18 and into engagement with the hull of the marine vessel 13 so as to retain the base mount 14 in place with respect to the hull.

In some embodiments, communications lines, such as electrical cables, fiber optic cables, or the like, may extend from a control system of the marine vessel (described in more detail below) to each of the mounting assemblies 10. For example, as illustrated in FIGS. 5-7, a communication line 47 may extend through the central aperture of the bottom panel 15 and into the interior space of the base mount 14. As such, the communication line 47 may be coupled with the camera 12, as described in more detail below.

Next, the sub-housing 30 can be engaged with the base mount 14. In particular, the sub-housing 30 can be inserted into the interior space of the base mount 14 through the opening at the distal end of the base mount 14. The sub-housing 30 is oriented such that the side supports 34 are aligned with the shelf surfaces 22 of the base mount 14. As such, the sub-housing 30 is inserted within the interior space of the base mount 14 until each of the side supports 34 engages with one of the shelf surfaces 22. Specifically, in embodiments in which the shelf surfaces 22 are concavely shaped as semi-circles, a first half of each of the side supports 34 (which are shaped generally as circles) may be received into engagement with one of the shelf surfaces 22. In such a configuration, the bottom panel 32 of the sub-housing 30 will generally be positioned further within the interior space of the base mount 14 than the side supports 34. As such, the sub-housing 30 may be oriented such that the central aperture of the bottom panel 32 is aligned with the longitudinal axis "X" of the base mount 14 (i.e., the axis "X" extends through the center of the central aperture).

The sub-housing 30 may be held in place within the base mount 14 via a pair of mounting brackets 48 and fasteners, such as illustrated in FIGS. 2 and 3. The mounting brackets 48 may each comprise an arcuate section of material configured to fit around a portion of one of the side supports 34 of the sub-housing 30. Specifically, the mounting brackets 48 may each have an arcuate, semi-circle shape. First halves (i.e., proximal halves) of the side supports 34 of the sub-housing 30 can be received into engagement with the shelf surfaces 22 of the base mount 14 and secured in place via fasteners extending through the mounting brackets 48 and into engagement with the base mount 14 (See, e.g., FIG. 6).

Furthermore, the camera 12 may be releasably mounted to the sub-housing 30. Such mounting may be performed prior to (or after) the sub-housing 30 being mounted within the base mount 14. In more detail, the camera 12 may be engaged with the sub-housing 30 such that the main section 42 of the camera 12 is positioned adjacent to the bottom panel 32 of the sub-housing 30 (with the main section 42 positioned between the side supports 34 of the sub-housing 30), and the electrical port 46 extending through the central aperture of the bottom panel 32 of the sub-housing 30. In certain embodiments one or more dampers 50, as shown in FIGS. 2, 3, and 6, which may comprise compression springs or pieces of elastic material, may be positioned between the main section 42 of the camera 12 and the bottom panel 32 of the sub-housing 30. For example, each mounting assembly 10 may include four dampers 50 positioned between the main section 42 of the camera 12 and the bottom panel 32 of the sub-housing 30. Specifically, one damper 50 may be positioned between each of the four corners of the main section 42 of the camera 12 and the corners of the bottom panel 32 of the sub-housing 30. The camera 12 may be retained in place in engagement with the sub-housing 30 via a securement cap 52 that fits over the lens section 44 of the camera 12 (See, e.g., FIG. 6). Fasteners may extend through the securement cap 52 and into engagement with the sub-housing 30 so as to securely engage the camera 12 between the securement cap 52 and the sub-housing 30. Furthermore, in some embodiments, one or more trim caps 54 may fit over and be retained to the securement cap 52 and/or the lens section 44 to provide a smooth surface contour of the mounting assembly 10 and/or the camera 12. The trim caps 54 may be securely engaged with the securement cap 52 via snap fit connection or other engagement devices. Some embodiments may provide for a gasket to be provided between the trim cap 54 and the securement cap 52, so as to provide weather resistance and/or waterproofing to the camera mounting system. Specifically, for instance, the gaskets may prevent water from entering the mounting assemblies 10, which might damage the camera 12, damage the marine vessel's 13 electrical/communication systems, and/or otherwise cause operational or safety problems for the marine vessel 13. Thus, the interior space of the mounting assembly 10 may be at least partially waterproof.

In some embodiments, the communications line 47 (e.g., electrical cable, fiber optic cable, etc.) will be coupled with the camera 12 prior to the camera 12 being coupled with the sub-housing 30. For example, the communication line 47 may be positioned within the interior space of the base mount 14 (e.g., extending from the control system of the marine vessel 13 and through the central aperture formed in the bottom panel 15 of the base mount 14). As such, the communication line 47 can be extended through the bottom panel 32 of the sub-housing 30 (with the sub-housing 30 already coupled with the base mount 14) and coupled with the electrical port 46 of the camera 12 prior to the camera 12 being engaged with the sub-housing 30. In other embodiments, such as when the sub-housing 30 is not yet engaged with the base mount 14, the communication line can be coupled with the electrical port 46 of the camera 12 after the camera 12 is engaged with the sub-housing 30.

Finally, with the camera 12 and the sub-housing 30 engaged within the interior space of the base mount 14, the cover 36 may be secured to the distal end of the base mount 14. As such, as shown in FIG. 5, the lens section 44 of the camera 12 will extend through the central aperture formed in the cover 36, while the cover 36 covers the remaining components of the mounting assembly 10. Some embodiments may provide for a gasket to be provided between the cover 36 and the base mount 14, so as to provide further weather resistance and/or waterproofing to the camera mounting system. Specifically, for instance, the gaskets may prevent water from entering the mounting assemblies 10, which might damage the camera 12, damage the vehicle's electrical/communication systems, and/or otherwise cause operational or safety problems for the marine vessel 13. Thus, the interior space of the mounting assembly 10 may be at least partially waterproof.

Beneficially, the mounting assemblies 10 of embodiments of the present invention permit the associated cameras 12 to be properly positioned at generally any required orientation. For example, in some embodiments, it may be necessary for the camera 12 and/or base mount 14 to be positioned in a level orientation, such that the camera 12, base mount 14, and/or other components of assembly 10 are generally level with respect to the horizontal (i.e., with respect to a horizontal plane that is parallel with a tangent line to the Earth's surface). In more detail, each mounting assembly 10 permits the camera 12 to be rotated by at least two axes (as illustrated in FIGS. 2 and 6), including the longitudinal axis "X" of the base mount 14 and/or of the mounting assembly 10 more generally, and a lateral axis "Y" which extends generally laterally with respect to the base mount 14 and/or of the mounting assembly 10 more generally and that is perpendicular to the longitudinal axis "X."

Figure 8:
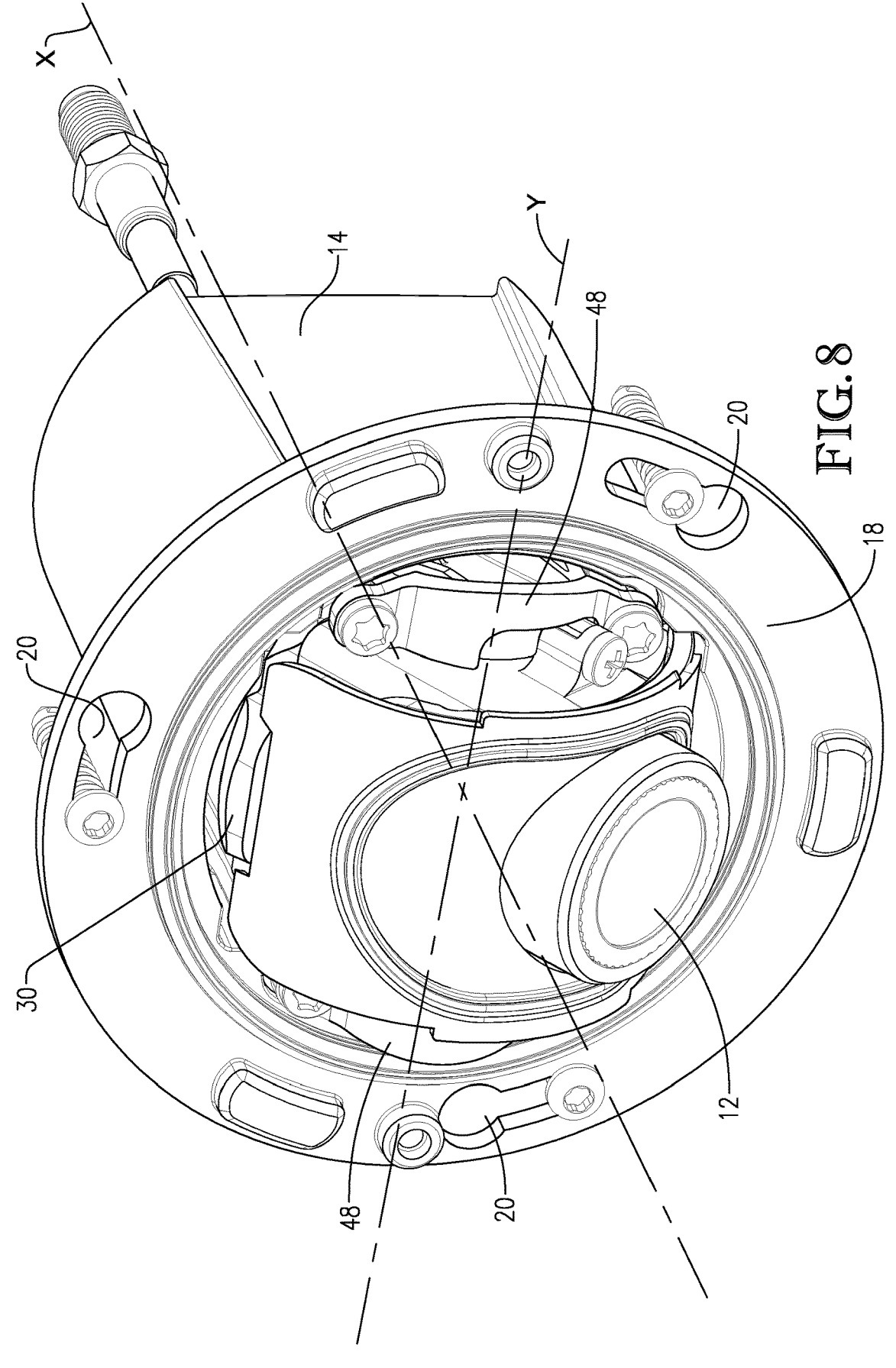
FIG. 8 is a front perspective view of the mounting assembly and the camera from FIG. 1 with a cover of the mounting assembly removed.

With the components of the mounting assembly 10 assembled together, as illustrated in FIG. 8, and mounted to the hull of the marine vessel 13 (not shown), including with the camera 12 mounted to the mounting assembly 10, the camera 12 can be rotated about the longitudinal axis "X" of the mounting assembly 10 as follows. First, the cover 36 can be removed (if not already removed) from the remaining components of the mounting assembly 10 so as to provide access to the base mount 14. As such, the fasteners can be loosened from the receiving apertures 20 of the annular flange 18. As illustrated, the receiving apertures 20 may be elongated so as to extend at least partially around the circumference of the annular flange 18. As such, with the fasteners loosened from the annular flange 18 (though not entirely removed), the base mount 14 can be rotated about the longitudinal axis "X." For example, the annular flange 18 of the base mount 14 can be rotated around the fasteners that are loosened but that still extend through the elongated receiving apertures 20. Because the sub-housing 30 and the camera 12 are rigidly connected to the base mount 14, the sub-housing and the camera 12 can also be rotated (in conjunction with the base mount 14) about the longitudinal axis "X." As such, the longitudinal axis "X" may be a roll axis about which the camera 12 can rotate. Once the camera 12 has been rotated about the longitudinal axis "X" to an intended orientation, the fasteners can be re-tightened through the receiving apertures 20 of the annular flange 18, so as to hold the base mount 14, the sub-housing 30, and the camera 12 in the intended orientation with respect to the marine vessel 13.

In addition to rotation about the longitudinal axis "X," the sub-housing 30 and the camera 12 can be rotated about the lateral axis "Y." Specifically, with the cover 36 removed, the fasteners securing the mounting brackets 48 of the sub-housing 30 to the base mount 14 can be loosened. As such, the sub-housing 30 and the camera 12 can be rotated about the lateral axis "Y" via the side supports 34 of the sub-housing 30 rotating about the shelf surfaces 22 of the base mount 14 (See also FIGS. 2 and 6). As such, the lateral axis "Y" may be a tilt axis about which the camera 12 can rotate. Once the camera 12 has been rotated about the lateral axis "Y" to the intended orientation, the fasteners can be re-tightened through the mounting brackets 48 of the sub-housing 30 and into engagement with the base mount 14, so as to hold the sub-housing 30 and the camera 12 in the intended orientation with respect to the marine vessel 13.

In some embodiments, the camera mounting system may include a calibration system for aiding in efficiently positioning the cameras 12 in intended orientations. The calibration system may comprise, for each camera 12, one or more attitude sensors 60 (See FIG. 9) and/or one or more visual indicators 62 (See FIGS. 6, 7 and 9). The attitude sensors 60 may comprise accelerometers, gyroscopes, or other components configured to sense an orientation of the attitude sensors 60 and/or the elements to which the attitude sensors are attached/associated (e.g., the cameras 12). The visual indicators 62 may comprise light-emitting diodes (LEDs) or other types of light-emitting elements or visual displays. However, the calibration system may, in some embodiment, comprise indicators other than visual indicators 62, such as audible speakers, vibrational elements, or the like. Embodiments may provide for attitude sensors 60 and/or visual indicators 62 to be attached to, integrated with, and/or otherwise associated with each of the cameras 12. For example, the attitude sensors 60 may be embedded inside the cameras 12. The visual indicators 62 may include at least two LEDs, as illustrated in FIG. 7. In other embodiments, the attitude sensors 60 and/or visual indicators 62 may be attached to, integrated with, and/or otherwise associated with components of the mount assemblies 10, such as integrated with each of the sub-housings 30 of the mounting assemblies 10. Regardless, the attitude sensors 60 and/or visual indicators 62 may receive electrical power from an internal battery associated with the camera 12 (or associated with the mounting assemblies 10) or from the marine vessel's 13 control system 70 illustrated in FIG. 9 (e.g., via the camera's 12 wired or wireless connection with the control system 70). For example, electrical power may be provided, via the control system 70, from a battery, of the marine vessel 13 and/or another source including an integrated battery, to the camera 12 and/or to the calibration system through the communication line 47.

The calibration system may be used as follows to properly orientate a camera 12. In embodiments in which the calibration system include two or more visual indicators 62, such as one green colored LED and one red colored LED. The green colored LED may provide an indication as to the camera 12 being properly oriented about the longitudinal axis "X" (e.g., level or another desired orientation about the camera's 12 the roll axis), while the red colored LED may provide an indication as to the camera 12 being properly oriented about the lateral axis "Y" (e.g., level or another desired orientation about the camera's 12 tilt axis). Specifically, during a user installation or calibration of a camera 12, the attitude sensor 60 may sense an orientation of the camera 12. If the camera 12 is not properly oriented with respect to the longitudinal axis "X," the green colored LED may blink (i.e., flicker or strobe). As such, the user may view the blinking, green colored LED and understand that the camera 12 is not properly oriented about the longitudinal axis "X." The user may then adjust the orientation of the camera 12 about the longitudinal axis "X" by rotating the base mount 14 with respect to the hull of the marine vessel 13, as previously described. During such adjustment, the attitude sensor 60 will continue to monitor the orientation of the camera 12, and when the camera is properly oriented about the longitudinal axis "X," the green colored LED may be caused to change from blinking to a solid, constant (non-blinking) illumination. The green colored LED emitting a solid, constant illumination will provide an indication to the user that the camera 12 is properly oriented about the longitudinal axis "X", such that the camera 12 can be secured in such proper orientation.

Similarly, if the camera is not properly oriented with respect to the lateral axis "Y" (i.e., the tilt axis), the red colored LED may blink (i.e., flicker or strobe). As such, a user may view the blinking red colored LED and understand that the camera is not properly oriented about the lateral axis "Y." The user may then adjust the orientation of the camera about the lateral axis "Y" by rotating the sub-housing 30 with respect to the base mount 14 as previously described. During such adjustment, the attitude sensor 60 will continue to monitor the orientation of the camera 12, and when the camera is properly oriented (e.g., about the lateral axis "Y"), the red colored LED may be caused to change from blinking to a solid, constant (non-blinking) illumination. The red colored LED emitting a solid, constant illumination will provide an indication to the user that the camera is properly oriented about the lateral axis "Y," such that the camera 12 can be secured in such orientation.

Control of the visual indicators 62 may be provided by control elements (e.g., processing elements, memory elements, software) incorporated integrally with the cameras 12. Specifically, such control elements may obtain orientation information from the attitude sensors 60 and control the visual indicators 62 based on the information received from the attitude sensors 60. In other embodiments, the control system 70 of the marine vessel 13 (described in more detail below) may control the visual indicators 62 of the cameras 12 by obtaining orientation information from the attitude sensors 60 and controlling the visual indicators 62 based on the information received from the attitude sensor 60.

In view of the above, embodiments of the present invention provide for a camera mounting assembly that includes a plurality of mounting assemblies 10 positioned around the hull of a marine vessel 13, as shown in FIG. 4, with each of the mounting assemblies 10 having a camera 12 mounted thereto so as to provide multiple camera angle views and overlapping fields of view of the external environment around the marine vessel 13. As illustrated in FIG. 4, embodiments may provide for a marine vessel to include six mounting assemblies 10 and six associated cameras 12. One mounting assembly 10 and associated camera 12 may be positioned on the bow of the marine vessel 13 so as to provide a view of the external environment in front of the marine vessel 13. One mounting assembly 10 and associated camera 12 may be positioned on each of the starboard and port bows of the marine vessel 13 so as to provide forward right and forward left views, respectively, of the external environment of the marine vessel 13. Another mounting assembly 10 and associated camera 12 may be positioned on the stern of the marine vessel 13 so as to provide a view of the external environment behind the marine vessel 13. Further, one mounting assembly 10 and associated camera 12 may be positioned on each of the starboard and port quarters of the marine vessel 13 so as to provide rearward right and rearward left views, respectively, of the external environment of the marine vessel 13. However, it should be understood that embodiments may provide for the camera mounting assembly to include generally any number of mounting assemblies 10 and cameras 12, as may be required for the particularly marine vessel. Nevertheless, certain embodiments provide for each of the cameras 12 to be connected to the control system 70 of the marine vessel 13 via wired connection (e.g., via the communication lines 47) or wirelessly (e.g., Wi-Fi, Bluetooth, etc.).

In more detail, the control system 70 of the marine vessel 13 may be configured to facilitate control of marine vessel 13. Depending on the design of the marine vessel 13, this may include controlling the amount of thrust provided by and/or the orientation of some or all of the motors and/or a position of a rudder or other control surfaces of the marine vessel 13. The control system 70 may employ substantially any suitable technology for accomplishing its stated functions, such as various wired and/or wireless controls. The control system 70 may also include a navigation functionalities configured to inform the user with regard to operating the control system 70, including with regard to maneuvering the marine vessel 13 for docking and to avoid objects in the marine environment. For instance, control system 70 may utilize computer vision techniques to detect objects and hazards within the field of view of cameras 12. As such, the control system 70 may employ substantially any suitable technology for accomplishing its stated functions, such as various conventional navigational technologies.

By way of navigational technologies, the control system 70 may include one or more sensors for detecting an orientation, change in orientation, direction, change in direction, position, and/or change in position of the marine vessel 13. In one implementation, the control system 70 may include a location determining component that is configured to detect a position measurement for the marine vessel 13 (e.g., geographic coordinates of at least one reference point on the vessel, such as a motor location, vessel center, bow location, stern location, etc.). In one implementation, the location determining component may be a global navigation satellite system (GNSS) receiver (e.g., a global positioning system (GPS) receiver, software defined (e.g., multi-protocol) receiver, or the like). In one implementation, the control system 70 may be configured to receive a position measurement from another device, such as an external location determining component or from at least one of the motors. Other positioning-determining technologies may include a server in a server-based architecture, a ground-based infrastructure, one or more sensors (e.g., gyros or odometers), a Global Orbiting Navigation Satellite System (GLONASS), a Galileo navigation system, and the like.

In one implementation, the control system 70 may include a magnetometer or GNSS heading sensor configured to detect an orientation measurement for the marine vessel 13. For example, the magnetometer or GNSS heading sensor may be configured to detect a direction in which the bow of the marine vessel 13 is pointed and/or a heading of the marine vessel 13. In one implementation, the control system 70 may be configured to receive an orientation measurement from another device, such as an external magnetometer, an external GNSS heading sensor, a location determining device, and/or the motors. In one implementation, the control system 70 may include or be communicatively coupled with at least one attitude sensor (e.g., accelerometer and/or gyroscope) of the marine vessel 13 for detecting the orientation or change in orientation of the marine vessel 13. For example, an attitude sensor may be used instead of or in addition to the magnetometer or GNSS heading sensor to detect the orientation. The control system 70 may utilize one or more of the sensors described herein, such as orientation or attitude sensors, to provide stabilization functionality for images and videos generated by cameras 12.

Figure 9:
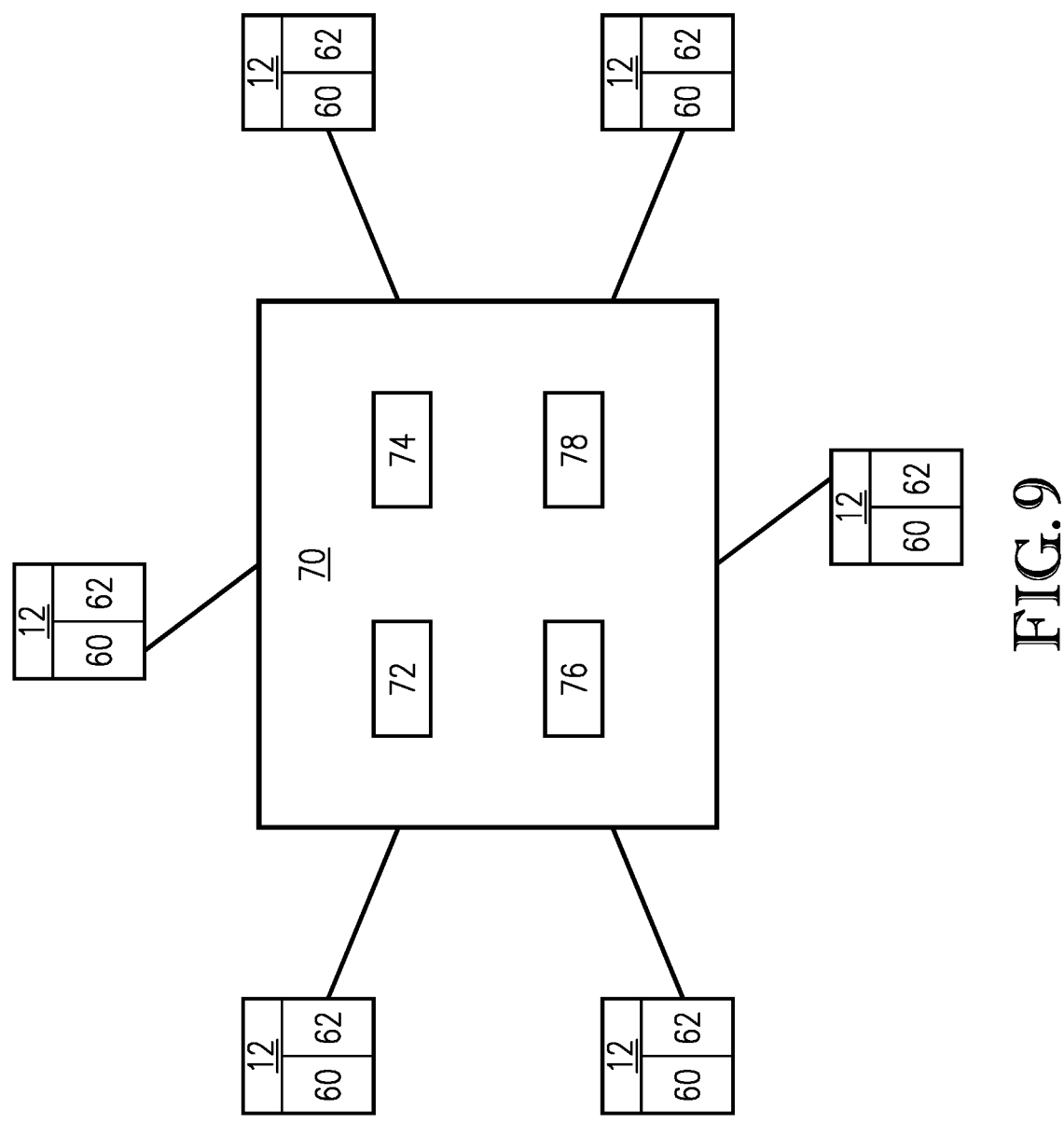
FIG. 9 is a block diagram of a control system of a vehicle in communication with a plurality of cameras.

Returning to the control system 70 more generally, the control system 70 may comprise a computing device that includes one or more processing elements 72, as illustrated in FIG. 9, communicatively coupled to the marine vessel's 13 location and orientation determining components and configured to receive the position and orientation measurements and to control the integration and other processing and display of this and other navigational information, and may perform other functions described herein. The processing elements 72 may be implemented in hardware, software, firmware, or a combination thereof, and may include any number of processors, controllers, microprocessors, microcontrollers, programmable logic controllers (PLCs), field-programmable gate arrays (FPGAs), application specific integrated circuits (ASICs), or any other component or components that are operable to perform, or assist in the performance of, the operations described herein. Various features provided by the processing elements 72, and in turn the control system 70, may be implemented as software modules that are executable by the processing elements 72 to provide desired functionality.

The processing elements 72 may also be communicatively coupled to or include electronic memory elements 74 for storing instructions or data. The memory elements 74 may be a single component or may be a combination of components that provide the requisite storage functionality. The memory elements 74 may include various types of volatile or non-volatile memory such as flash memory, optical discs, magnetic storage devices, SRAM, DRAM, or other memory devices capable of storing data and instructions.

In addition to the foregoing components, the control system 70 may be operationally connected to the cameras 12. As such, the control system 70 may include (or otherwise be associated with) a display device 76 and a user interface 78. Each of the display 76 and the user interface 78 may be integrated within a common housing, such as in embodiments where navigation technologies of the control system includes a chartplotter. In other configurations, the display 76 and/or user interface 78 may be configured as discrete elements that use wired or wireless communication techniques to interface with various components of the control system. In various configurations, a plurality of displays 76 and user interfaces 78 may be employed to display, control, or otherwise utilize functionality provided by cameras 12.

In view of the above, the control system 70 is configured to receive and process the images and/or video generated from the cameras 12. The display 76 may be configured to display the processed images and/or video. In various implementations, a single image from a single camera 12 may be individually displayed, multiple images from multiple cameras 12 may be simultaneously displayed, and/or images from selected cameras 12 may be displayed individually or simultaneously. The display 76 may employ substantially any suitable technology for accomplishing its stated functions, such as liquid crystal display (LCD), light-emitting diode (LED) display, light-emitting polymer (LEP) display, thin film transistor (TFT) display, gas plasma display, or any other type of display. The display 76 may be backlit such that it may be viewed in the dark or other low-light environments. The display 76 may be of any size and/or aspect ratio. In one implementation, the display 76 may include touchscreen technology, such as resistive, capacitive, or infrared touchscreen technologies, or any combination thereof. In one implementation, the display 76 may be a chartplotter which integrates and displays position data with electronic navigational charts.

The user interface 78 may be configured to allow the user to provide input regarding operation of some or all of the other components of the control system. The user interface 78 may employ substantially any suitable technology for accomplishing its stated functions, such as electromechanical input devices (e.g., buttons, switches, toggles, trackballs, and the like), touch-sensitive input devices (e.g., touchpads, touch panels, trackpads, and the like), pressure-sensitive input devices (e.g., force sensors or force-sensitive touchpads, touch panels, trackpads, buttons, switches, toggles, trackballs, and the like), audio input devices (e.g., microphones), cameras (e.g., for detecting user gestures or for face/object recognition), or a combination thereof. In configurations, the user interface 78 is integrated with the display 76, such as in embodiments where the display 76 is configured as a chartplotter and the user interface 78 is configured to control the operation of the chartplotter through buttons, touch sensors, and/or other controls.

As noted above, cameras 12 can be mounted, via the mounting assemblies 10, at various locations around the marine vessel 13 so as to provide required views of the external environment around the marine vessel 13. Each camera 12 may be connected wired (e.g., via the communication line 47) or wirelessly to the display 76, via the marine vessel's 13 control system 70, for viewing images and/or video captures by the camera 12. Furthermore, the control system 70 and/or display 76 may, in some embodiments, be used to assist in positioning and/or calibrating the cameras 12, as well as properly displaying the images/videos generated by the cameras 12. For example, information from the attitude sensors 60 of the cameras 12 may be provided to the control system 70 and/or to the display 76 to assist in installation and alignment of the various cameras 12. For example, information regarding the orientation of the cameras 12 may be presented on the display 76 (from the attitude sensors 60) such that a user can determine whether or not the one or more cameras 12 are properly oriented. If the cameras 12 are not properly oriented, the user can adjust the orientations manually by manually rotating the cameras 12 about the longitudinal and lateral axes "X", "Y" of the associated mounting assemblies 10, as was previously described. In addition, the control system 70 of the marine vessel 13 may be able to automatically adjust attributes of the cameras 12 based on the information received from the attitude sensors 60. For example, the cameras 12 may be installed, via the mounting assemblies 10, into the marine vessel 13 in any orientation, including inverted, without requiring the user to engage in complex configuration/reconfiguration steps. If the control system 70 determines, based on the information received from the attitude sensors 60, that one or more of such cameras 12 has been installed inverted, the control system 70 can automatically invert/flip the images and/or video generated by such one or more cameras 12 so as to display the resulting images and/or video in a proper orientation on the display 76 (i.e., the image and/or video can be displayed from the inverted cameras 12 in a non-inverted orientation).

Figure 10:
FIG. 10 is a perspective cross section of the mounting assembly and the camera from FIG. 1.

Finally, the dampers 50 positioned between each of the cameras 12 and the sub-housings 30, as illustrated in FIG. 10, allow the cameras 12 to be protected from impacts by external objects (e.g., docks, shores, rocks, buoys, other boats, logs, and/or other debris). For example, if the marine vessel 13 impacts an external object (or an external object impacts the marine vessel 13) so as to make contact with one of the cameras 12, the dampers 50 permit the camera 12 to temporarily translate toward the sub-housing 30. Specifically, due to such an impact, the camera 12 may be retracted against the dampers 50, towards the bottom panel 32 of the sub-housing 30, so as to retract further within the interior space of the base mount 14 (i.e., towards the bottom panel 15 of the base mount 14). After the external object is no longer contacting the camera 12, the camera 12 can return to its initial position under force of the dampers 50. Thus, the cameras 12 can be considered spring loaded so as to provide protection from impacts from external objects. Stated differently, the base mount 14 (as described previously) comprises a primary opening at a distal end of the base mount 14, with the primary opening providing access to the interior space of the base mount 14. Generally, the camera 12 is configured to be positioned adjacent to the primary opening of the base mount 14 (with the lens section 44 extending through the central aperture of the cover 36) when the camera 12 is mounted to the sub-assembly 30 and in a normal operating position, as shown in FIG. 10. However, upon an external object impacting the camera 12, the dampers 50 permit the position of the camera 12 to temporally translate toward the sub-housing 30 and within the interior space of the base mount 14 to a retracted position. Upon the external object no longer contacting the camera 12, the dampers 50 force the camera 12 back to the normal operating position.

In view of the above, the camera mounting system described above may comprise a plurality of mounting assemblies 10 that each allow an associated camera 12 to be installed on exterior surface of a vehicle so as to achieve a desired field of view of the external environment of the vehicle. In addition, each mounting assembly 10 permits the position of its associated camera 12 to be adjusted about at least two axes of rotation, such that the position of the camera 12 can be changed as necessary to achieve a required orientation. Furthermore, each mounting assembly 10 allows replacement of its respective camera 12 without removing the entire mounting assembly 10 from the vehicle, such that the cameras 12 may be easily replaced without requiring complex work on the structure of the vehicle. Furthermore, the mounting assemblies 10 may each include dampers 50, so as to make their respective cameras 12 spring loaded to allow the cameras 12 to retract into the mounting assemblies 10 to provide impact resistance. Finally, the mounting assemblies 10 may be at least partially waterproof through the range of movement of the cameras 12, so as to provide environmental protection for the cameras 12 and for the vehicle.

The invention claimed is:

1. A camera mounting system for a vehicle, said camera mounting system comprising:
   a base mount configured to be coupled with an exterior surface of the vehicle, wherein the base mount includes an interior space;
   a sub-housing received within the interior space of the base mount, wherein the sub-housing includes at least a bottom panel and the sub-housing is configured to rotate within the base mount;
   a camera configured to be removably mounted to the sub-housing,
      wherein the camera includes a lens section and an optical axis extending through the lens section,
      wherein when the camera is mounted to the sub-housing the camera is configured to rotate in conjunction with the sub-housing, and is biased toward a normal operating position spaced from the bottom panel;

at least one damper positioned between the camera and the bottom panel of the sub-housing, wherein the damper is configured to permit a position of the camera to translate from the normal operating position toward the bottom panel along a direction parallel to the optical axis in response to an external object impacting the camera, and to bias the camera back to the normal operating position after the external object no longer contacts the camera; and
   at least one attitude sensor configured to sense an orientation of the camera.

2. The camera mounting system of claim 1, wherein the sub-housing is removably received within the interior space of the base mount.

3. The camera mounting system of claim 1, wherein the base mount is elongated and presents a central longitudinal axis extending through the interior space of the base mount.

4. The camera mounting system of claim 3, wherein the base mount is configured to be rotated about the central longitudinal axis.

5. The camera mounting system of claim 4, wherein the sub-housing and the camera are further configured to tilt about a lateral axis, wherein the lateral axis is perpendicular to the central longitudinal axis presented by the base mount.

6. The camera mounting system of claim 1, wherein the at least one damper comprises a compression spring.

7. The camera mounting system of claim 6, wherein the base mount comprises a primary opening at an end of the base mount, wherein the primary opening provides access to the interior space, and wherein the camera is configured to be positioned in the normal operating position adjacent to the primary opening when the camera is mounted to the sub-housing.

8. The camera mounting system of claim 7, wherein upon the external object impacting the camera the compression spring permits the position of the camera to temporally translate toward the bottom panel along the direction parallel to the optical axis and within the interior space of the base mount, wherein upon the external object no longer contacting the camera the spring forces the camera back to the normal operating position.

9. The camera mounting system of claim 1, wherein the at least one damper comprises a plurality of compression springs positioned between the camera and the sub-housing.

10. The camera mounting system of claim 1, wherein the at least one attitude sensor comprises an accelerometer.

11. The camera mounting system of claim 10, wherein the accelerometer is integrated with the camera.

12. The camera mounting system of claim 1, further comprising a visual indicator configured to provide an indication when the camera is properly oriented.

13. The camera mounting system of claim 12, wherein the visual indicator comprises a light-emitting diode.

14. The camera mounting system of claim 13, wherein the light-emitting diode is integrated with the camera.

15. The camera mounting system of claim 1, wherein the camera is configured to communicate with a control system of the vehicle, such that the control system can present images obtained from the camera on a display.

16. The camera mounting system of claim 15, wherein the camera is configured to communicate with the control system via a wired connection.

17. The camera mounting system of claim 1, wherein the vehicle is a marine vessel, and the base mount is configured to be mounted to a hull of the marine vessel.

18. A method of mounting a camera to a vehicle, said method comprising the steps of:

(a) providing a base mount engaged with an exterior surface of the vehicle, wherein the base mount includes an interior space;

(b) providing a sub-housing received within the interior space of the base mount, wherein the sub-housing includes at least a bottom panel and the sub-housing is configured to rotate within the base mount (c) mounting the camera to the sub-housing, wherein the camera includes a lens section and an optical axis extending through the lens section, and wherein upon said mounting of step (c) the camera is configured to rotate in conjunction with the sub-housing and the camera is biased toward a normal operating position spaced from the bottom panel;

(d) sensing, from an attitude sensor, an orientation of the camera; and (e) providing a damper between the camera and the bottom panel of the sub-housing, wherein the damper is configured to permit a position of the camera to translate from the normal operating position toward the bottom panel along a direction parallel to the optical axis in response to an external object impacting the camera, and to bias the camera back to the normal operating position after the external object no longer contacts the camera.

19. The method claim 18, wherein the base mount is configured to rotate about a central longitudinal axis of the base mount, and wherein the sub-housing and the camera are further configured to tilt about a lateral axis that is perpendicular to the central longitudinal axis presented by the base mount.

20. The method of claim 18, wherein the attitude sensor comprises an accelerometer, and wherein the camera further comprises a visual indicator configured to provide an indication when the camera is properly oriented.

* * * * *